US010404702B1

United States Patent
Chakraborty et al.

(10) Patent No.: US 10,404,702 B1
(45) Date of Patent: Sep. 3, 2019

(54) SYSTEM AND METHOD FOR TENANT NETWORK IDENTITY-BASED AUTHENTICATION AND AUTHORIZATION FOR ADMINISTRATIVE ACCESS IN A PROTECTION STORAGE SYSTEM

(71) Applicant: EMC Corporation, Hopkinton, MA (US)

(72) Inventors: Subhasish Chakraborty, Livermore, CA (US); Uday Jonnala, Cupertino, CA (US); Hongyu Zhang, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 280 days.

(21) Appl. No.: 15/085,937

(22) Filed: Mar. 30, 2016

(51) Int. Cl.
*H04L 29/06* (2006.01)
*H04L 29/08* (2006.01)
*H04L 29/12* (2006.01)

(52) U.S. Cl.
CPC .......... *H04L 63/10* (2013.01); *H04L 61/2007* (2013.01); *H04L 63/08* (2013.01); *H04L 67/1097* (2013.01); *H04L 61/6068* (2013.01)

(58) Field of Classification Search
CPC ..... H04L 63/10; H04L 61/2007; H04L 63/08; H04L 67/1097
USPC .......................................................... 726/4
See application file for complete search history.

(56) References Cited

U.S. PATENT DOCUMENTS

| | | | | |
|---|---|---|---|---|
| 6,289,462 B1 * | 9/2001 | McNabb | ............. | G06F 21/6218 726/21 |
| 8,001,610 B1 * | 8/2011 | Chickering | ............. | G06F 21/00 709/225 |
| 8,046,578 B1 * | 10/2011 | Trudeau | .................. | H04L 63/08 713/154 |
| 8,146,160 B2 * | 3/2012 | Orr | ...................... | H04L 63/0209 713/168 |
| 8,275,895 B1 * | 9/2012 | Ellis | ...................... | H04L 63/168 709/227 |
| 8,490,868 B1 * | 7/2013 | Kropf | ................... | G07F 19/206 235/379 |
| 8,612,696 B2 | 12/2013 | Zhu et al. | | |
| 8,635,184 B2 | 1/2014 | Hsu et al. | | |
| 9,215,075 B1 * | 12/2015 | Poltorak | ................. | H04L 63/04 |
| 9,258,305 B2 * | 2/2016 | Higuchi | ............. | H04L 63/0884 |

(Continued)

FOREIGN PATENT DOCUMENTS

WO       2008008183 A3      1/2008

*Primary Examiner* — Farid Homayounmehr
*Assistant Examiner* — Thanh T Le
(74) *Attorney, Agent, or Firm* — Womble Bond Dickinson (US) LLP

(57) ABSTRACT

In one embodiment, a request is received from a remote device of a user for configuring a tenant-unit of a storage system via a secure connection session. A secure multi-tenancy (SMT) module determines a first network identity associated with the secure connection session. The SMT module examines an SMT registry namespace associated with the tenant-unit of the tenant to determine a second network identity that has been assigned to the tenant-unit. The first network identity is compared with the second network identity. The request is allowed to configure the tenant-unit in response to determining that the first and second network identities match; otherwise, the request is denied.

24 Claims, 10 Drawing Sheets

(56) References Cited

U.S. PATENT DOCUMENTS

| | | | |
|---|---|---|---|
| 2002/0053031 A1* | 5/2002 | Bendinelli | H04L 12/4641 726/15 |
| 2002/0136226 A1* | 9/2002 | Christoffel | H04W 12/02 370/401 |
| 2003/0172269 A1* | 9/2003 | Newcombe | H04L 29/06 713/168 |
| 2005/0050357 A1* | 3/2005 | Jeng | H04L 41/12 726/4 |
| 2005/0060534 A1* | 3/2005 | Marvasti | H04L 63/0272 713/151 |
| 2005/0149759 A1* | 7/2005 | Vishwanath | G06F 21/121 726/4 |
| 2006/0248600 A1* | 11/2006 | O'Neill | G06F 21/31 726/29 |
| 2007/0056022 A1* | 3/2007 | Dvir | G06F 21/31 726/4 |
| 2009/0064287 A1* | 3/2009 | Bagepalli | H04L 63/166 726/4 |
| 2010/0042734 A1* | 2/2010 | Olafsson | H04L 63/0236 709/229 |
| 2010/0325717 A1* | 12/2010 | Goel | H04L 63/102 726/11 |
| 2011/0173294 A1* | 7/2011 | Jackson | G06F 17/30575 709/217 |
| 2011/0252459 A1* | 10/2011 | Walsh | G06F 21/33 726/4 |
| 2012/0174198 A1* | 7/2012 | Gould | H04L 63/0807 726/6 |
| 2012/0192250 A1* | 7/2012 | Rakan | G06F 3/03545 726/2 |
| 2013/0007891 A1* | 1/2013 | Mogaki | G06F 21/62 726/27 |
| 2013/0297795 A1* | 11/2013 | McGrath | G06F 9/452 709/226 |
| 2014/0157298 A1* | 6/2014 | Murphy | H04N 21/64322 725/14 |
| 2014/0237544 A1* | 8/2014 | Higuchi | H04L 63/0884 726/3 |
| 2014/0373097 A1* | 12/2014 | Thayer | H04L 63/0823 726/4 |
| 2015/0026780 A1* | 1/2015 | Igarashi | H04L 63/10 726/5 |
| 2015/0067804 A1* | 3/2015 | Maxwell | H04L 63/083 726/7 |
| 2015/0100677 A1* | 4/2015 | Matsumoto | H04L 67/10 709/223 |
| 2015/0154293 A1* | 6/2015 | Lu | G06Q 10/00 707/770 |
| 2015/0236965 A1* | 8/2015 | Short | H04L 63/08 709/233 |
| 2015/0281451 A1* | 10/2015 | Gajjar | H04M 3/5191 379/265.09 |
| 2015/0356258 A1* | 12/2015 | Moore | G06F 19/3481 705/2 |
| 2015/0373004 A1* | 12/2015 | Hopkins | G06F 16/278 726/6 |
| 2016/0042194 A1* | 2/2016 | Chakraborty | G06F 3/0605 726/17 |
| 2016/0182565 A1* | 6/2016 | Salvador | H04L 63/20 726/1 |
| 2017/0034193 A1* | 2/2017 | Schulman | H04L 63/1416 |
| 2017/0063827 A1* | 3/2017 | Ricardo | H04L 63/08 |
| 2017/0215136 A1* | 7/2017 | Liu | H04W 48/18 |
| 2017/0272472 A1* | 9/2017 | Adhar | H04L 63/205 |

\* cited by examiner

| Username | User ID | Tenant Unit ID(s) | Others |
|---|---|---|---|
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| 301 | 302 | 303 | 304 |

| Tenant Unit (TU) ID | TU Name | Source/Remote IP | Destination/Local IP | Others |
|---|---|---|---|---|
| UUID 1 | ⋮ | ⋮ | ⋮ | ⋮ |
| UUID 2 | ⋮ | ⋮ | ⋮ | ⋮ |
| UUID 3 | ⋮ | ⋮ | ⋮ | ⋮ |
| ⋮ | ⋮ | ⋮ | ⋮ | ⋮ |
| 351 | 352 | 353 | 354 | 355 |

SYSTEM AND METHOD FOR TENANT NETWORK IDENTITY-BASED AUTHENTICATION AND AUTHORIZATION FOR ADMINISTRATIVE ACCESS IN A PROTECTION STORAGE SYSTEM

FIELD OF THE INVENTION

Embodiments of the present invention relate generally to multi-tenant data storage systems. More particularly, embodiments of the invention relate to tenant network identity-based authentication and authorization of a multi-tenant storage system.

BACKGROUND

Multi-tenancy refers to a technology wherein a single storage appliance is deployed to serve multiple customers, each customer using the same storage appliance for their protection storage requirements. A storage system which supports multi-tenancy, must satisfy the security and isolation requirements between tenants. Here, the "security and isolation requirements" refer to the requirements that each customer's dataset must be secured and isolated from the other customers on the storage appliance. The security and isolation requirements apply to data access. For example, a customer must not be able to read or write to datasets that belong to another customer. The security and isolation requirements can also refer to control access. For example, an administrator of one customer must not be able to perform system configuration, monitoring, etc., of the datasets that belong to another customer. Thus, although the customers may share the same storage appliance for backup, restore, or replicating their datasets, none of the customers can be aware of the presence of other customers in the storage appliance.

In a conventional system, once a hacker obtains the credentials of an administrator, the hacker can access the system to perform data management operations, for example, to configure tenant or tenant-unit information.

BRIEF DESCRIPTION OF THE DRAWINGS

Embodiments of the invention are illustrated by way of example and not limitation in the figures of the accompanying drawings in which like references indicate similar elements.

FIGS. 3A and 3B are block diagrams illustrating an example of a security registry namespace according to one embodiment of the invention.

DETAILED DESCRIPTION

Figure 1A:
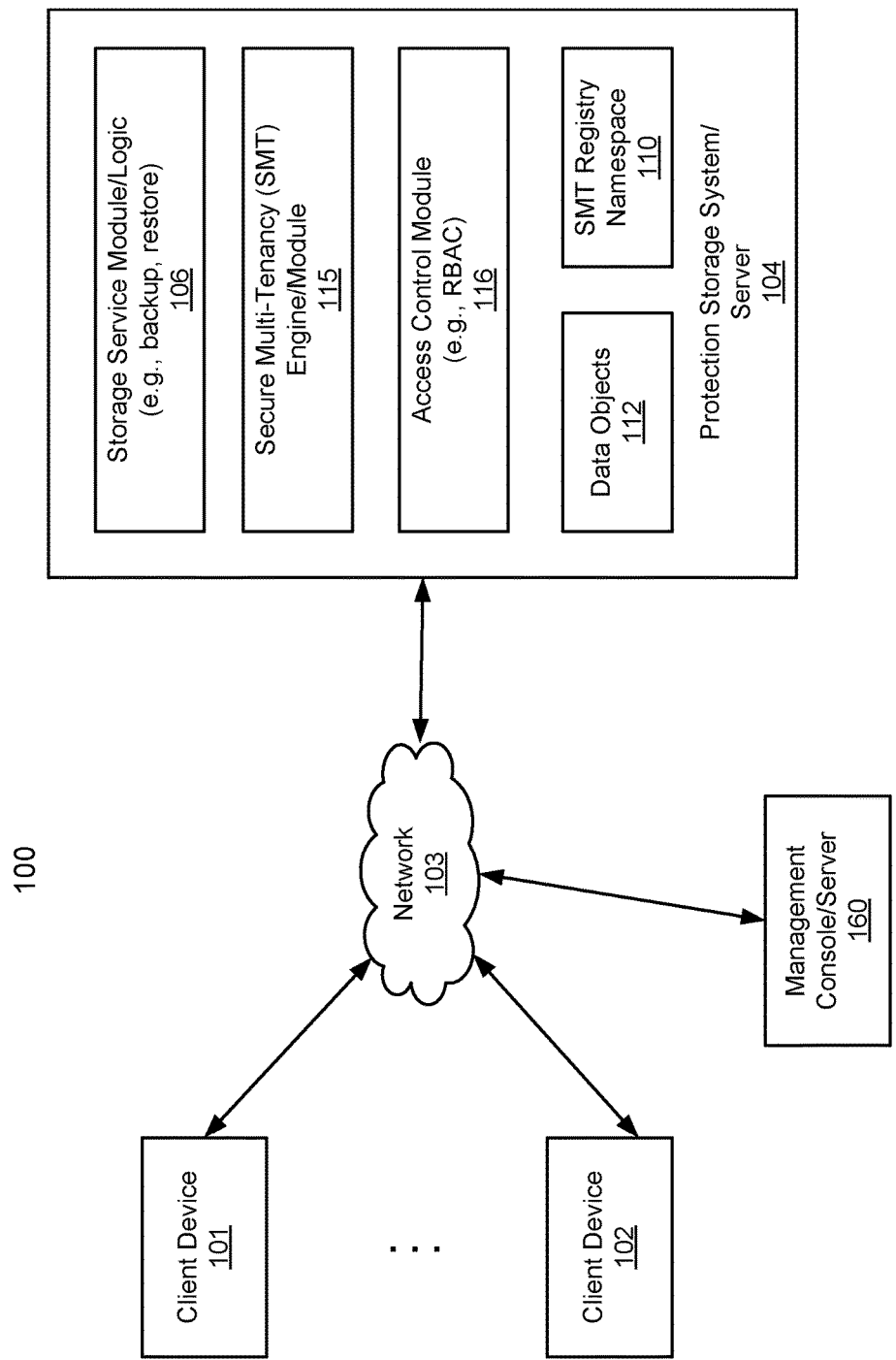
FIGS. 1A and 1B are block diagrams illustrating a storage system according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a network identity-based authentication and authorization mechanism is utilized to authenticate and/or authorize a user based on a network interface through which the user logs onto a multi-tenancy protection storage system. In order to perform control operations to view or modify configuration for a tenant-unit, a user has to establish a connection with the protection storage system through a predetermined network identity (e.g., source and destination network addresses from a user point of view, or remote and local network addresses from a storage system point of view). The network identity may be specified and associated with a particular storage system, a particular tenant of a particular storage system, or a particular tenant-unit of a particular tenant. The configuration of the network identities may be stored as part of configuration metadata in the SMT registry namespace. Thus, even if a hacker illegally obtains login credentials of an administrator, the hacker has to know and establish a network connection through a proper network identity (e.g., on the same network as of the tenant); otherwise, the access may be denied.

According to one embodiment, when a request is received from a remote device of a user via a secure connection session with the storage system to log in and establish an administrative session for configuring or viewing configuration of a tenant-unit, in addition to authenticating the user via its username and password, a secure multi-tenancy (SMT) module determines a first network identity through which the secure connection session is established (e.g., a network address or addresses used to establish the secure connection). The SMT module examines an SMT registry namespace associated with the requested tenant-unit to determine a second network identity that has been assigned to the requested tenant-unit and stored in the SMT registry namespace. The SMT module compares the first network identity and the second network identity to determine whether they match. If the first network identity matches the second network identity, the login request for the administrative session to configure the tenant-unit is allowed; otherwise, the request is denied. A network identity may refer to a remote network address (or source network address from the user's pint of view), a local network address (or destination network address from the user's point of view), or both the remote and local network addresses. In one embodiment, a network address may be an Internet protocol (IP) address.

FIG. 1A is a block diagram illustrating a storage system according to one embodiment of the invention. Referring to FIG. 1A, system 100 includes, but is not limited to, one or more client systems 101-102 communicatively coupled to protection storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as protection storage system 104. Network 103 may be any type of networks such as a local area network (LAN), a wide area network (WAN) such as the Internet, a fiber network, a storage network, or a combination thereof, wired or wireless.

Protection storage system 104 may include or represent any type of servers or a cluster of one or more servers (e.g., cloud servers). For example, protection storage system 104 may be a storage server used for various different purposes, such as to provide multiple users or client systems with access to shared data and/or to back up (or restore) data (e.g., mission critical data). Protection storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Protection storage system 104 may further provide storage services via an object-based protocol and Hadoop distributed file system (HDFS) protocol.

In one embodiment, protection storage system 104 includes, but is not limited to, storage service engine 106 (also referred to as service logic, service module, or service unit, which may be implemented in software, hardware, or a combination thereof) to provide storage services (e.g., backup, restore services) to data (e.g., data objects 112) stored in one or more storage units or devices (not shown). Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in a persistent storage device. The restore logic is configured to retrieve and restore backup data from a storage device back to a client (e.g., clients 101-102).

The storage units storing data 112 (not shown) may be implemented locally (e.g., single node operating environment) or remotely (e.g., multi-node operating environment) via interconnect, which may be a bus and/or a network (e.g., a storage network or a network similar to network 103). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

The data stored in server 104 may be deduplicated by deduplication logic or engine and stored in a form of deduplicated data segments. In response to a data file to be stored in the storage units, according to one embodiment, deduplication logic (not shown) is configured to segment the data file into multiple segments (also referred to as chunks) according to a variety of segmentation policies or rules. The deduplication logic may choose not to store a segment in a storage unit if the segment has been previously stored in the storage unit. In the event that the deduplication logic chooses not to store the segment in the storage unit, it stores metadata enabling the reconstruction of the file using the previously stored segment. As a result, segments of data files are stored in a deduplicated manner. The metadata may be stored in at least some of the storage units, such that files can be accessed independent of another storage unit. Metadata of each storage unit includes enough information to provide access to the files it contains.

In one embodiment, protection storage system 104 further includes a storage manager or storage controller (not shown) configured to manage storage resources of protection storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, protection storage system 104 further includes SMT module 115, access control module 116, and SMT registry namespace 110. SMT registry namespace 110 may be stored in a persistent storage device (e.g., hard disks) and implemented in a variety of data structures (e.g., tables, databases). SMT registry namespace 110 includes information defining, describing, and/or configuring each of tenants in a multi-tenancy storage system represented by server 104. A tenant refers to a hierarchical multi-tenancy object. Each tenant object includes information defining, describing, and/or configuring a corresponding tenant. Each tenant object may include or reference to one or more tenant-unit objects. Each of the tenant-unit objects represents a tenant-unit associated with the corresponding tenant. A tenant can have multiple tenant-units. However, no tenant-unit can be related to multiple tenants. A tenant may be an organization or enterprise entity, while a tenant-unit may be a division or business unit within an organization or enterprise entity. A tenant can exist across multiple storage systems, and each tenant is identified by a unique tenant identifier such as a universally unique identifier or UUID.

For example, a tenant-unit object may include information specifying who (e.g., user ID, user role, IP address) can configure the corresponding tenant, where (e.g., remote and local IP addresses from which the user logs in), and types of configuration operations (e.g., adding, removing, and/or modifying attributes) that a particular user can perform. The configuration operations may include user assignment/un-assignment of a tenant-unit, group assignment/un-assignment of a tenant-unit, storage unit assignment/un-assignment of a tenant-unit, remote administrative IP address assignment/un-assignment of a tenant-unit, and tenant-unit addition and removal, etc.

In one embodiment, SMT module 115 is configured to provide security and isolation to each tenant. For example, SMT module 115 is configured to allocate tenant-units to tenants by managing various configuration metadata in SMT registry namespace 110. Access control module 116 may be a role-based access control (RBAC) module configured to use configuration metadata in SMT registry namespace 110 to determine whether tenants may perform management operations as set forth above and various other resources at protection storage system 104. Note that SMT module 115 and access control module 116 may be implemented as a single module or engine. In this example as shown in FIG. 1A, client devices 101-102 may be associated with the same or different tenants, same or different tenant-units of a particular tenant. Alternatively, clients 101-102 may not be associated with any tenant or tenant-unit.

According to one embodiment, in addition to authenticating the user based on login credentials such as a username and password, SMT module 115 verifies a network identity through which the user has logged in, for example, by matching the logged-in network identity with the one previously specified in a corresponding tenant-unit of SMT registry namespace 110. SMT module 115 can verify whether the connection was originated from a particular remote network address (e.g., source network address from a user point of view) or logged into the storage system via a particular local network address (e.g., destination network address from a user point of view). The user is allowed to access configuration of the requested tenant-unit only if the user utilizes the proper network identity that has been assigned to the requested tenant-unit.

Figure 1B:
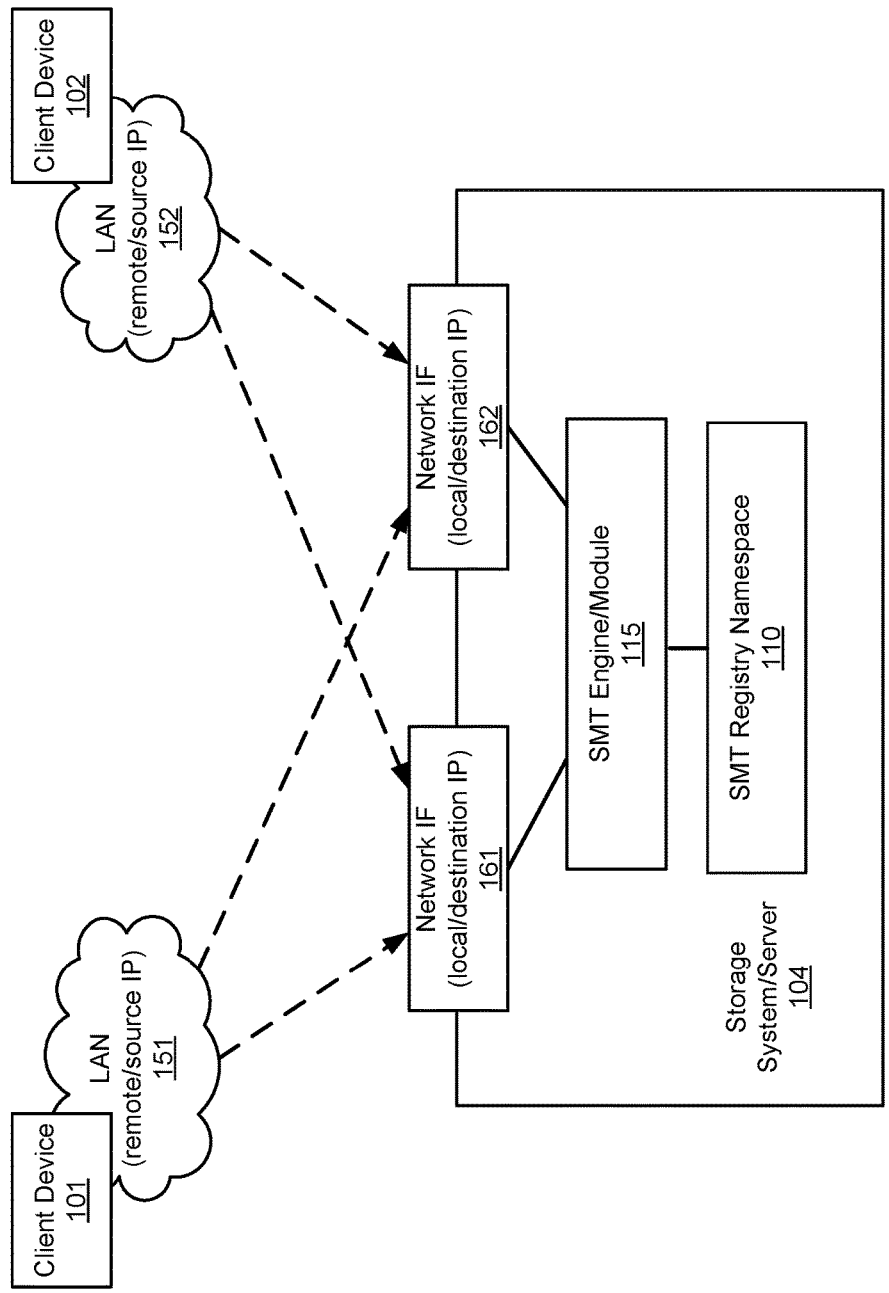

For example, as shown in FIG. 1B, client device 101 may be associated with local area network (LAN) 151 having a first network address associated with it (e.g., gateway uplink address), while client 102 may be associated with LAN 152 having a second network address associated with it. LAN 151 may be associated with a first tenant while LAN 152 may be associated with a second tenant. The first tenant and the second tenant may be associated with different organizations or enterprise entities. Alternatively, LANs 151-152 may be different tenant-units associated with a particular tenant. In this example, storage system/server 104 may be associated with a storage service provider that provides storage services multiple tenants over the Internet or cloud.

LAN 151 may be associated with a first source/remote IP address, while LAN 152 may be associated with a second source/remote IP address. Protection storage system 104 may be accessible via multiple network interfaces 161-162. Network interface 161 may be associated with a first destination/local IP address, while network interface 162 may be associated with a second destination/local IP address. In one embodiment, for a particular tenant-unit, a specific set of network identities, e.g., source/remote IP address and destination/local IP address, may be specified or assigned. For example, a tenant-unit can specify that in order to access its configuration data, a client has to come from LAN 151 and log onto protection storage system 104 via network interface 162 with a proper network identity. If client device 101 logs in from LAN 152 to access configuration data of the tenant, the access will be denied, even though it has been authenticated successfully via proper username and password. Similarly, if client device 101 comes from LAN 151 but logs in via network interface 161, the access is also denied.

In order to access the configuration data of a tenant-unit, a client device has to come from a specified source/remote IP address and log onto protection storage system 104 with a specified destination/local IP address. Thus, a secure connection between a client device and protection storage system 104 has to be established using proper a proper set of network identities, e.g., source/remote IP address and destination/local IP address (if specified). The network identity may be specified and associated with a particular tenant-unit of a particular tenant (e.g., tenant-unit-based settings). The configuration of the network identities may be stored as part of configuration metadata in SMT registry namespace 110. Thus, even if a hacker illegally obtains login credentials of an administrator, the hacker has to be on the same network as of the tenant; otherwise, the access will be denied.

Figure 2:
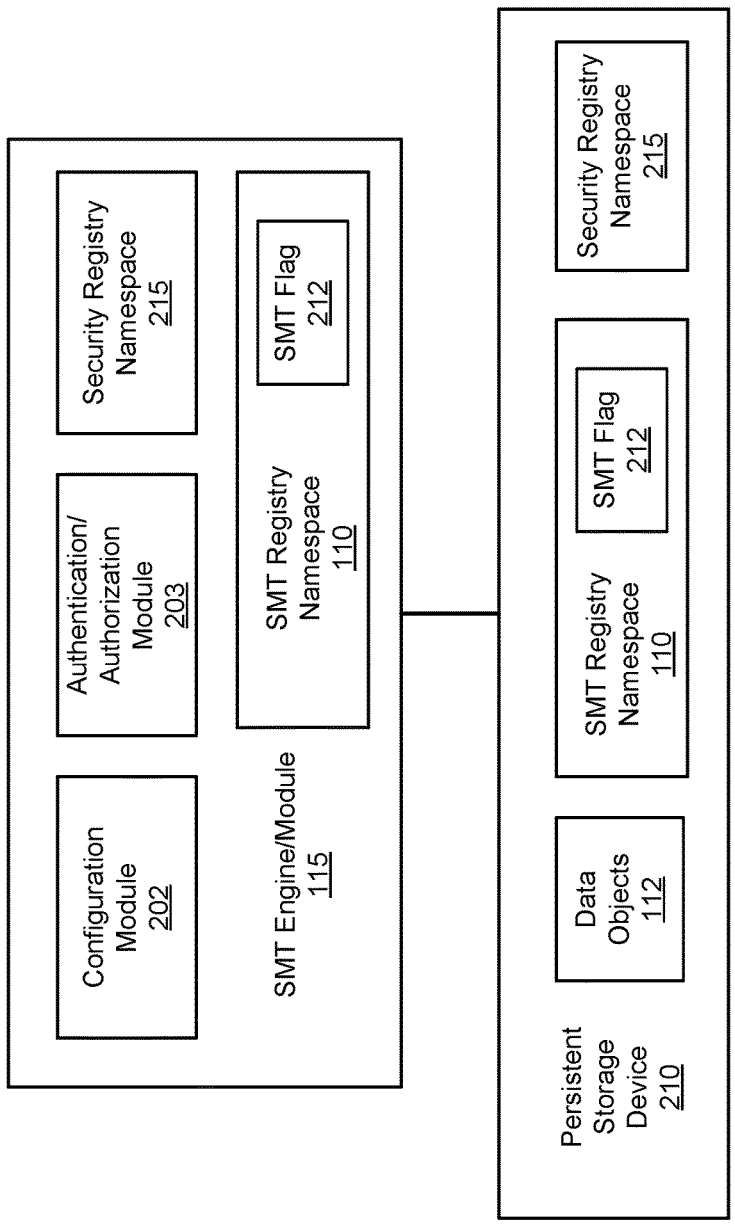
FIG. 2 is a block diagram illustrating an example of a secure multi-tenancy (SMT) engine according to one embodiment of the invention.

FIG. 2 is a block diagram illustrating an example of a secure multi-tenancy engine according to one embodiment of the invention. Referring to FIG. 2, system 200 includes SMT engine/module 110, which may be implemented in software, hardware, or a combination thereof. In one embodiment, SMT module 115 includes, but is not limited to, configuration module 202, authentication and authorization (AUTH) module 203, security registry namespace 215, and SMT registry namespace 110. SMT registry namespace 110 and security registry namespace 215 may be loaded in a system memory from persistent storage device 210. Persistent storage device 210 may be a variety of non-volatile storage devices such as hard disks.

In one embodiment, when configuration module 202 receives a request from a remote device of a user (e.g., client device 101 of FIG. 1) to establish an administrative session to configure or view configuration of a tenant-unit of a tenant stored in SMT registry namespace 110, in addition to authenticating the user based on its username and password, configuration module 202 communicates with AUTH module 203, for example, via an application programming interface (API) to determine whether the user is entitled or authorized to access the configuration of the tenant-unit. The request may be received from the remote device via a configuration interface (not shown), which may be a Web interface, an API, a command line interface (CLI), or any other interfaces or communication protocols.

In one embodiment, a user device establishes a secure connection with protection storage system 104 to configure a tenant-unit of a tenant. The secure connection may be an SSH (secure shell) connection session. SSH is a cryptographic (encrypted) network protocol operating at layer 7 of the OSI model to allow remote login and other network services to operate securely over an unsecured network. An SSH connection is established from a source IP address associated with a client device (referred to as a remote IP address from the server side) to a destination IP address associated with the server as a destination (referred to as a local IP address from the server side). One or both of the remote IP address and the local IP address can be utilized as part of a network identity to authenticate and authorize the user for accessing configuration of the tenant-unit.

According to one embodiment, in response to a request received from a remote device of a user for configuring or viewing configuration of a tenant-unit of a tenant, AUTH module 203 or configuration module 202 determines whether SMT flag 212 has been set to a predetermined value. SMT flag 212 indicates whether the SMT authentication and authorization is enabled. If SMT flag 212 indicates that the SMT authentication/authorization is disabled, the request to configure or view configuration of the tenant-unit is allowed.

If SMT flag 212 has been set to the predetermined value indicating that the SMT authentication/authorization is enabled, AUTH module 203 determines a first set of network identities associated with the SSH connection, such as, for example, a first source/remote IP address and a first destination/local IP address. AUTH module 203 determines a user ID identifying the user (e.g., username) and the tenant-unit based on the request. Based on the user ID, AUTH module 203 obtains a tenant-unit ID for the tenant-unit to be accessed. Based on the tenant-unit ID, AUTH module 203 performs a lookup operation in SMT registry namespace 110 to determine a second set of network identities that has been assigned to the tenant-unit, including a second source/remote IP address and a second destination/local IP address.

AUTH module 203 then compares the first source/remote IP address and the first destination/local IP address with the second source/remote IP address and the second destination/local IP address (if assigned), respectively. Note that one or both of the second source/remote IP address and second destination/remote IP address may be configured in SMT registry namespace. Thus, the matching between the first set of network identities and the second set of network identities is performed only on those IP addresses that have been configured. If the first network identities matches the second network identities, the request to configure or view configuration of the requested tenant is allowed and configuration module 202 performs the requested operations accordingly. Otherwise, the request will be denied.

According to one embodiment, in response to a request to configure or view configuration of a tenant, AUTH module 203 performs a first lookup operation in security registry namespace 215 based on a user ID (e.g., username) to obtain a list of one or more tenant-unit IDs identifying one or more tenant-units with which the user is associated. Based on the one or more tenant-unit IDs, AUTH module 203 performs a second lookup operation in SMT registry namespace to obtain the second set of network identities associated with the tenant-units. AUTH module 203 then performs the necessary authentication/authorization based on the first set of network identities and the second network identities as described above, to determine which of the tenant-units in the list the user is authorized to access their configuration.

FIG. 3A is a block diagram illustrating an example of a security registry namespace according to one embodiment of the invention. Referring to FIG. 3A, in one embodiment, security registry namespace 215 includes a number of entries, each entry corresponding to a user who is identified by username 301 and/or user ID 302. The entries may be indexed based on username 301 or user ID 302. Each entry maps a user to a list of one or more tenant-units that are identified by respective tenant-unit ID(s) 303. An entry may further store other information 304 associated with the corresponding user. In one embodiment, in response to a request from a user to access configuration of tenant-units, a lookup can be performed based on username 301 or user ID 302 to identify a list of one or more tenant-units 303 associated with the user. For each of the identified tenant-units, the network identity assigned to the tenant-unit is obtained from an SMT registry namespace to authorize the user. Note that security registry namespace 215 is shown and described in a form of mapping table, however, it can also be implemented in a variety of data structures or formats. For example, security registry namespace 215 can be implemented as a function accessible via an API.

FIG. 3B is a block diagram illustrating an example of an SMT registry namespace according to one embodiment of the invention. Referring to FIG. 3B, SMT registry namespace 110 includes a number of entries, each entry corresponding to a tenant-unit that is identified by tenant-unit ID 351 and/or tenant-unit name 352. Tenant-unit ID 351 may be universally unique ID (UUID). Each entry may further store source/remote IP address 353 and destination/local IP address 354 associated with the tenant-unit, as well as other information 355 associated with the tenant-unit. Source/remote IP address 353 and destination/local IP address 354 (e.g., a second set of network identities) are utilized to determine whether a particular user of a particular secure connection session (e.g., first set of network identities) can access the configuration of the corresponding tenant-unit. Note that SMT registry namespace 110 is shown and described in a form of mapping table, however, it can also be implemented in a variety of data structures or formats. For example, SMT registry namespace 110 can be implemented as a function accessible via an API.

Figure 4:
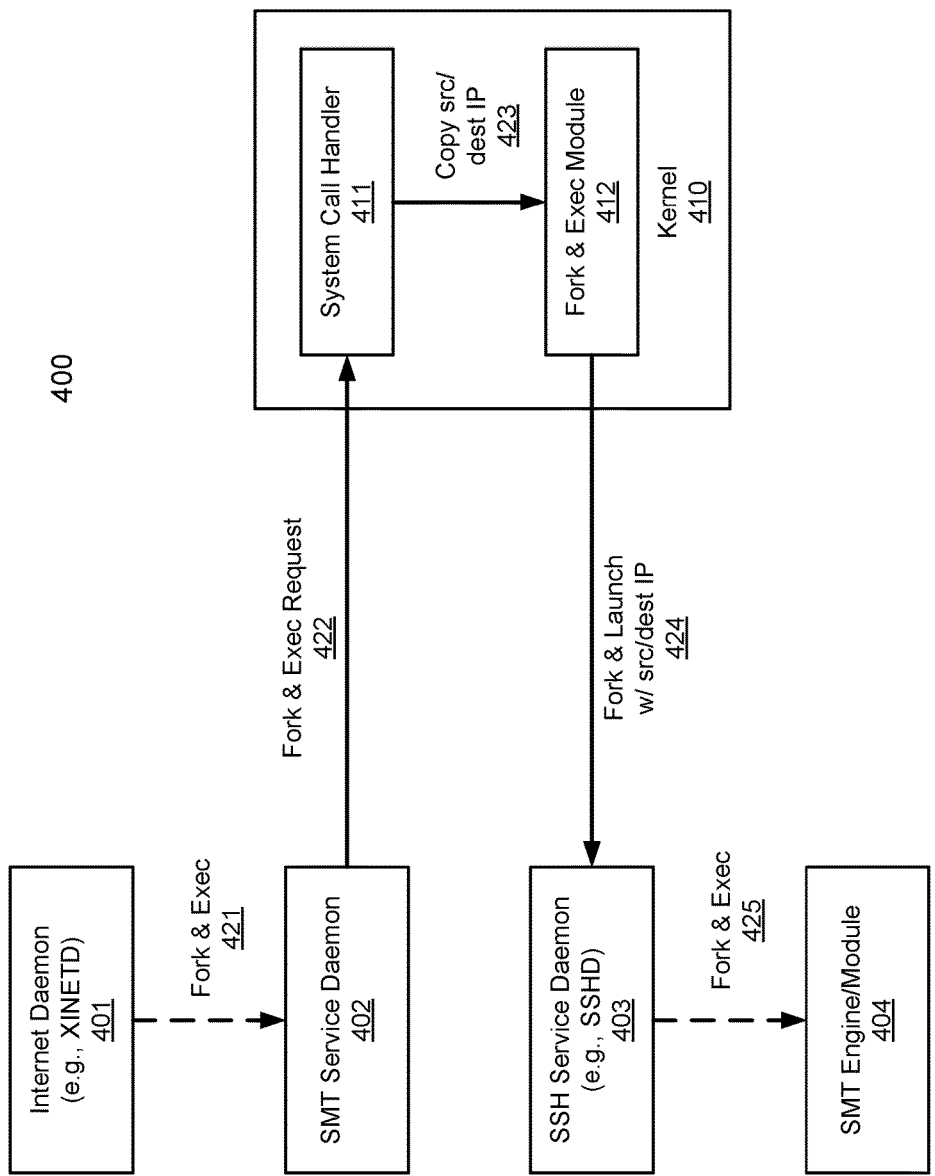
FIG. 4 is a block diagram illustrating an example of an SMT registry namespace cache according to one embodiment of the invention.

FIG. 4 is a block diagram illustrating a mechanism to determine a network identity of a secure connection session according to one embodiment of the invention. Referring to FIG. 4, system 400 may be implemented as part of an operating system of a protection storage system. System 400 includes an Internet daemon 401 responsible for handling any incoming service session request over the Internet. For example, Internet daemon 401 may be an XINETD compatible daemon available in a LINUX or UNIX based operating system. The XINETD listens for incoming requests over a network and launches the appropriate service for that request. Requests are made using port numbers as identifiers and XINETD usually launches another daemon to handle the request (e.g., FTP, Telnet, SSH).

In this example, Internet daemon 401 listens and detects that an incoming session is an SSH session. In response, Internet daemon 401 launches (e.g., fork and execute) SMT service daemon 402 via path 421. SMT service daemon 402 may have been configured in a configuration file associated with Internet daemon 401. SMT service daemon 402 extracts the source IP address and the destination IP address from a session request. SMT service daemon 402 then launches (e.g., fork & exec) the underlying SSH service daemon SSHD 403 by passing the source/destination IP addresses in a process data-structure. Typically, when forking and exec'ing a process, the information from the process data-structure of a parent process will not be carried over to the process data-structure of a child process in a conventional system. Thus, in a conventional system, the source/remote IP address and destination/local IP address would not be carried over from one process to another.

According to one embodiment, in a request to fork and execute a child process, for example, via a system call to kernel 410 of an operating system via path 422, system call handler 411 intercepts and examines the call to determine whether the system call is to fork and exec a predefined type of a process, in this example, an SSH process. If the targeted process is one of the predefined types, at least a portion of the information from a process data-structure of a parent process is copied to a process data-structure of a child process to be forked and executed via path 423. Otherwise, the information may not be carried over, similar to a conventional system. In one embodiment, the copied information includes a source/remote IP address and destination/local IP address of the secure connection. The child process with the copied information is then forked and executed by fork & exec module 412 via path 424, in this example, becoming child process SSHD 403. In this example, SSHD is a standard SSH daemon provided by the operating system. Similarly, when the SSHD 403 forks and execs an SMT process, in this example, SMT engine/module 404, the source/remote IP address and destination/local IP address of the secure connection will be passed to SMT engine/module 404 for SMT authentication and authorization as described above. SMT engine/module 404 may be part of SMT engine/module 115 of FIGS. 1A-1B.

Figure 5:
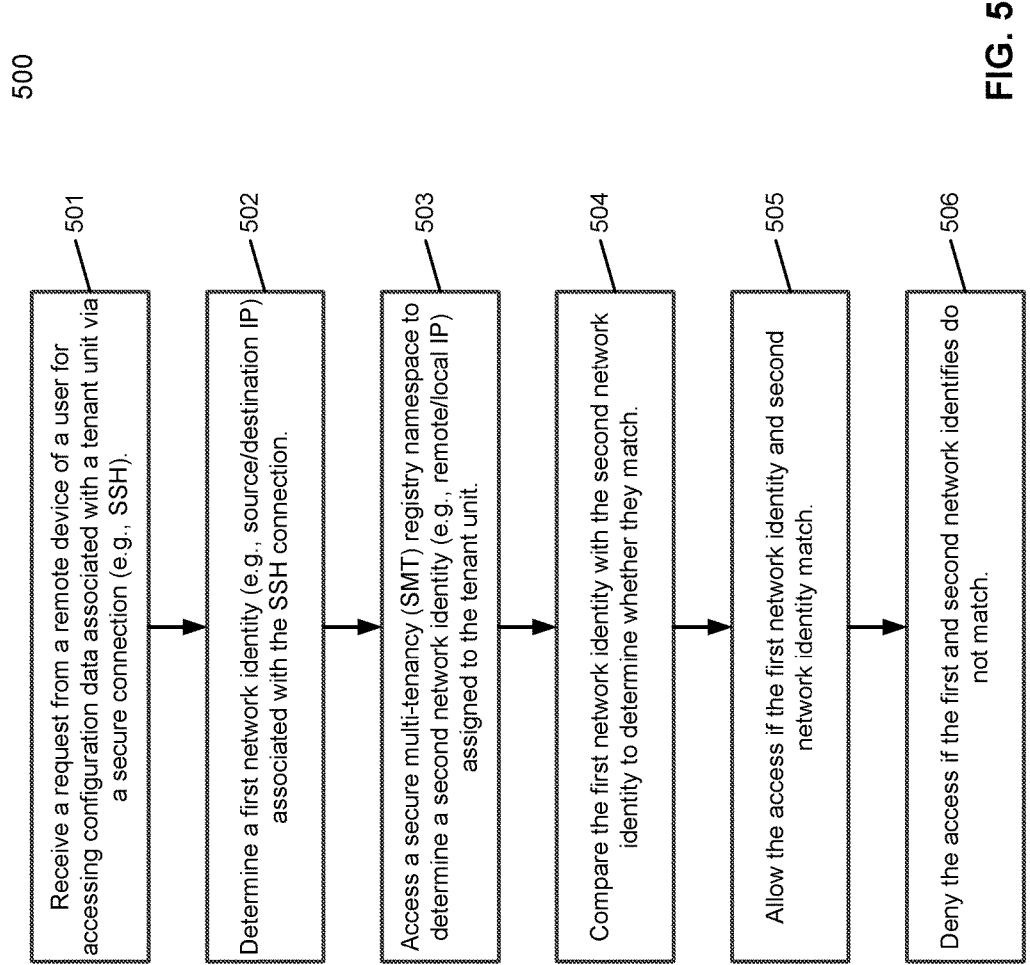
FIG. 5 is a flow diagram illustrating a process of authorizing a user for authorizing a user for establishing an administrative session according to one embodiment of the invention.

FIG. 5 is a flow diagram illustrating a process of authorizing a user for establishing an administrative session according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by system 200 of FIG. 2. Referring to FIG. 5, at block 501, processing logic receives a request from a remote device of a user for accessing configuration data associated with a tenant-unit of a tenant via a secure connection session. At block 502, processing logic determines a first network identity (e.g., source/destination IP) through which the secure connection session was established. At block 503, processing logic accesses an SMT registry namespace to determine a second network identity that has been assigned to the requested tenant-unit. At block 504, the first network identity is compared with the second network identity to determine whether they match. In response to determining that the first network identity matches the second network identity, at block 505, the request is allowed. Otherwise, at block 506, the request is denied.

Figure 6:
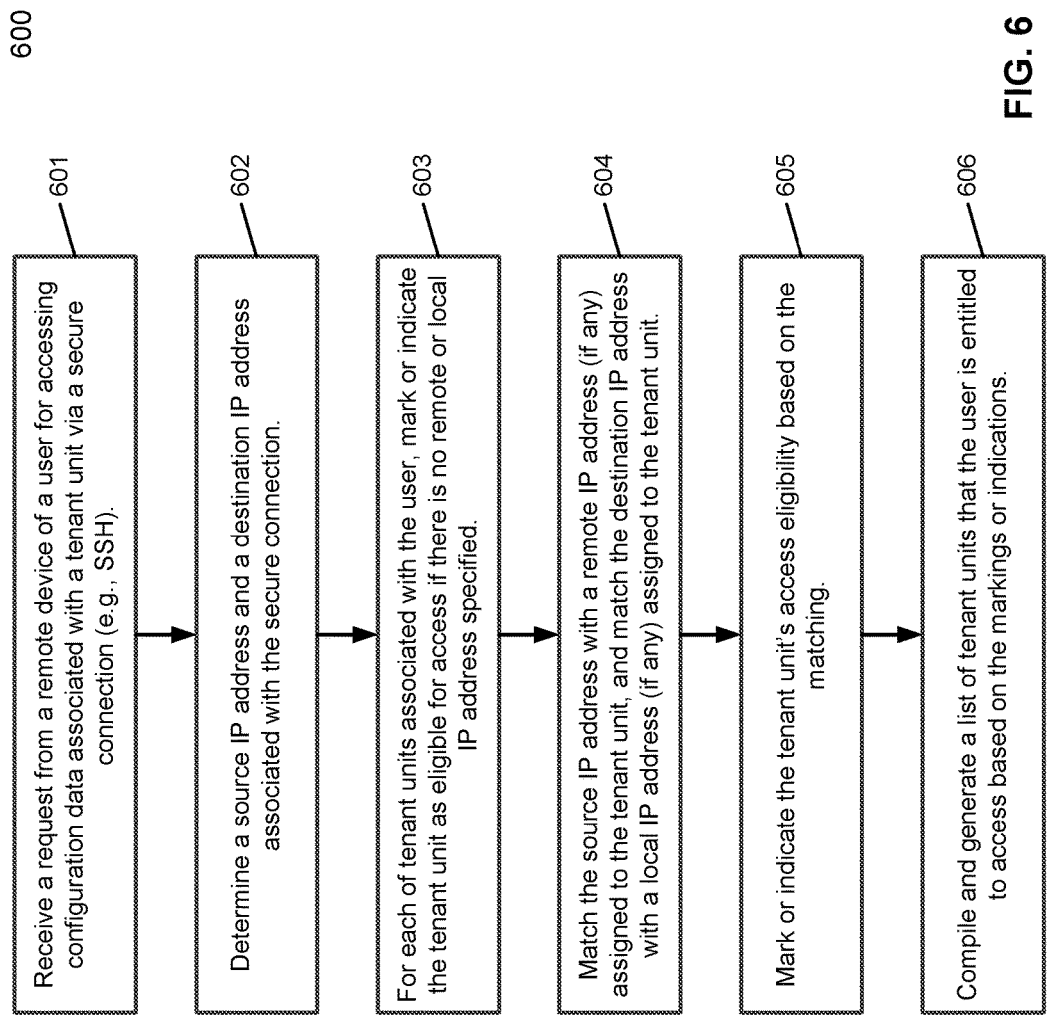
FIG. 6 is a flow diagram illustrating a process of authorizing a user for authorizing a user for establishing an administrative session according to another embodiment of the invention.

FIG. 6 is a flow diagram illustrating a process of authorizing a user for accessing configuration of tenant-units according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by system 200 of FIG. 2. Referring to FIG. 6, at block 601, processing logic receives a request from a remote device of a user for accessing configuration data of a storage system via a secure connection session. At block 602, processing logic determines a source IP address and a destination IP address (from the remote device point of view) of the secure connection. For each of the tenant-units associated with the user (e.g., a user has a user role within the tenant-unit), at block 603, processing logic marks the tenant-unit as eligible for the user to access, if there is no local IP address and remote IP address specified. In which case, the tenant-unit is not subject to network identity based authentication or authorization.

At block 604, processing logic matches the source IP address with a remote IP address (if any) assigned to the tenant-unit and matches the destination IP address with a local IP address (if any) assigned to the tenant-unit to determine whether the user is allowed to access the configuration data of the tenant-unit. The tenant-unit is then marked accordingly at block 605. That is, if a local IP address has been assigned to the tenant-unit, the local IP address is marched with the destination IP address of the secure connection; otherwise, the matching is skipped. Similarly, if a remote IP address has been assigned to the tenant-unit, the remote IP address is matched with the source IP address of the secure connection. If IP addresses match or the matching is skipped, the tenant-unit is marked as eligible. At block 606, a list of eligible tenant-units that the remote device of the user can access is generated, which can be utilized to authenticate and/or authorized the user for accessing a particular tenant-unit.

Figure 7:
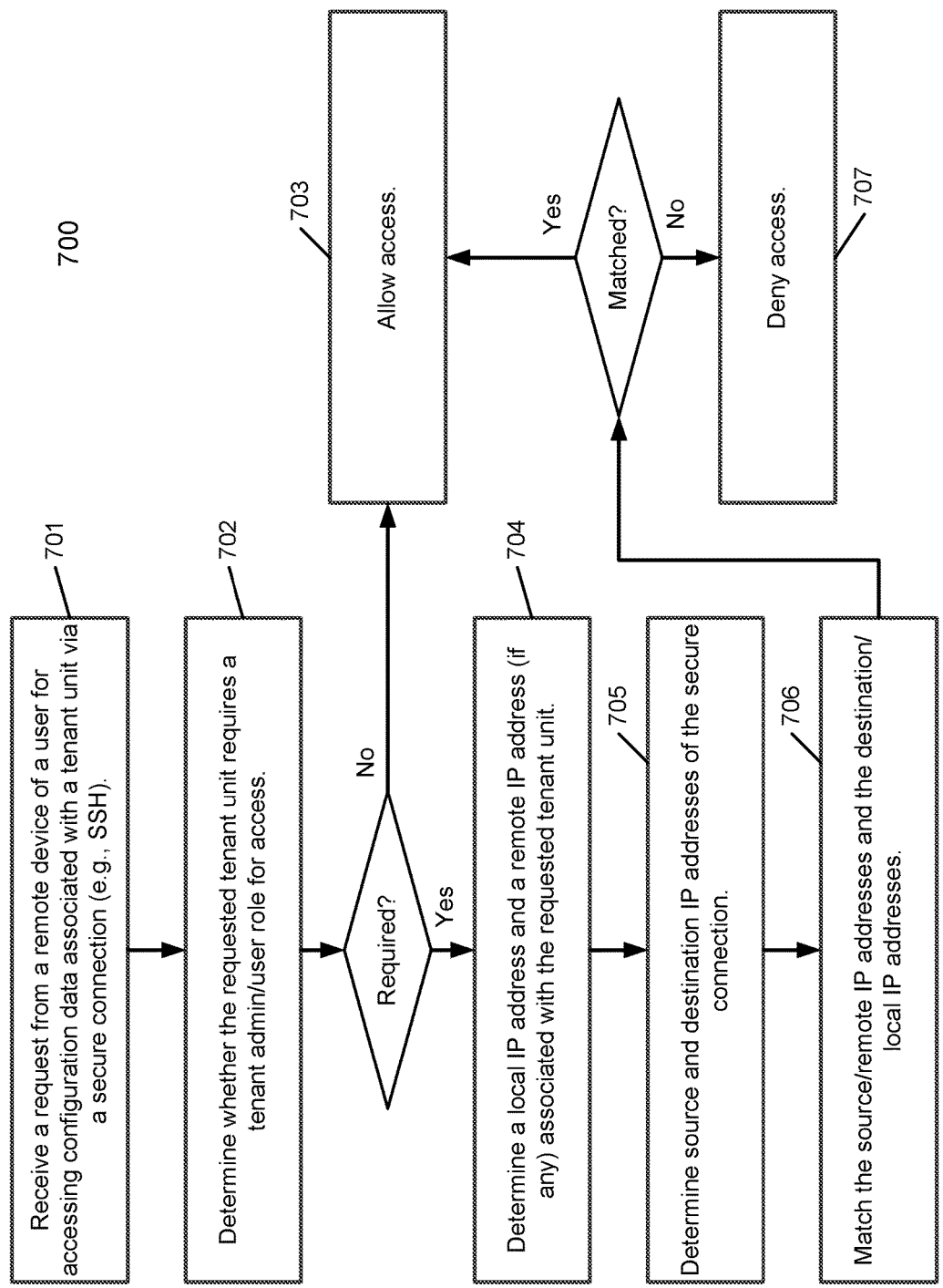
FIG. 7 is a flow diagram illustrating a process of authorizing a user for establishing an administrative session according to another embodiment of the invention.

FIG. 7 is a flow diagram illustrating a process of authorizing a user for establishing an administrative session according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by system 200 of FIG. 2. Referring to FIG. 7, at block 701, processing logic receives a request from a remote device of a user for accessing configuration data of a tenant-unit via a secure connection. At block 702, processing logic determines whether the requested tenant-unit requires an administrator role. If not, at block 703, the request is allowed.

Otherwise, at block 704, processing logic determines a local IP address and a remote IP address (if any) associated with the tenant-unit, for example, from the SMT registry namespace. At block 705, processing logic determines a source IP address and a destination IP address (from the remote device point of view) associated with the secure connection. At block 706, processing logic matches the source IP address with the remote IP address (if any) and matches the destination IP address with the local IP address (if any). If any of those IP addresses (if exist) do not match, at block 707, the access is denied; otherwise, the access is allowed at block 703. Note that if a local IP address is not specified in the SMT registry namespace, the destination IP address and the local IP address are considered "matched" for the purpose of allowing the access. Similarly, if a remote IP address is not specified in the SMT registry namespace, the destination IP address and the remote IP address are considered "matched" for the purpose of allowing access.

Note that some or all of the components as shown and described above (e.g., SMT engine/module 115 and/or access control module 116 of FIG. 1A) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
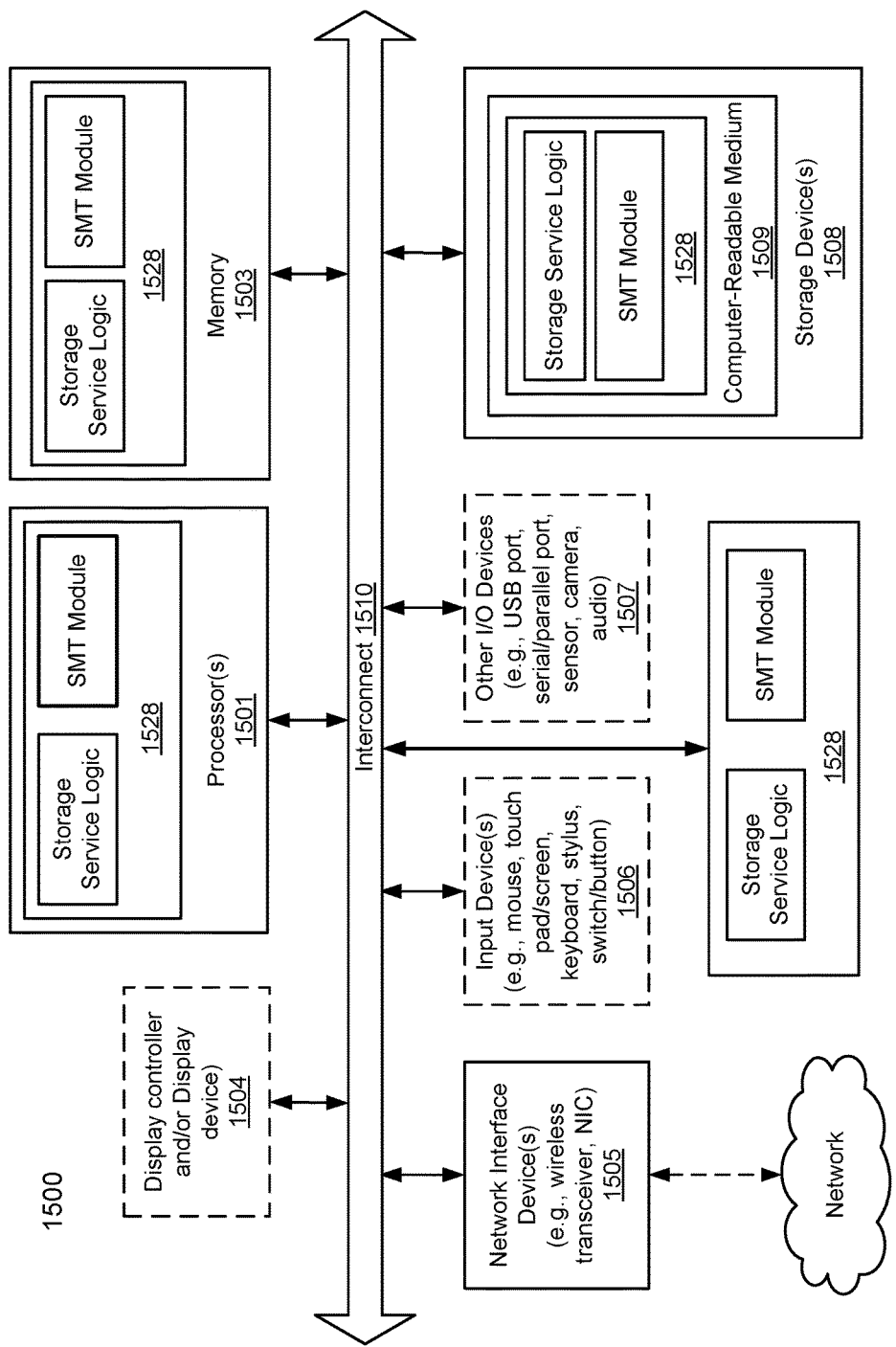
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for configuring a multi-tenancy storage system, the method comprising:
   in response to a request received from a remote device of a user for configuring a tenant-unit of a storage system via a user's secure connection session, determining whether the tenant-unit requires a tenant admin role for access,
   if the tenant admin role is not required, then the request is allowed;
   if the tenant admin role is required,
      determining a first network identity associated with the user's secure connection session wherein the first network identity is of the user's remote device used to establish the secure connection session;
      examining a secure multi-tenancy (SMT) registry namespace to determine a second network identity that has been assigned to the tenant-unit;
      comparing the first network identity with the second network identity to authenticate the user;
      allowing the request to configure the tenant-unit in response to determining that the first network identity matches the second network identity; and
      denying the request to configure the tenant-unit if the first and second network identities do not match.

2. The method of claim 1, further comprising:
- determining a first local network address associated with the first network identity;
- retrieving a second local network address associated with the second network identity from a registry entry of the SMT registry namespace corresponding to the tenant-unit; and
- determining whether the first local network address matches the second local network address, wherein the request to configure the tenant-unit is allowed if the first and second local network addresses match.

3. The method of claim 2, wherein the first local network address comprises a destination Internet protocol (IP) address associated with the user's secure connection session with respect to the remote device.

4. The method of claim 2, further comprising:
- determining a first remote network address associated with the first network identity;
- retrieving a second remote network address associated with the second network identity from the registry entry of the SMT registry namespace corresponding to the tenant-unit; and
- determining whether the first remote network address matches the second remote network address, wherein the request to configure the tenant-unit is allowed if the first and second remote network addresses match.

5. The method of claim 4, wherein the first remote network address comprises a source IP address associated with the user's secure connection session with respect to the remote device.

6. The method of claim 1, further comprising:
- examining an SMT flag to determine whether the SMT flag has been set to a predetermined value; and
- allowing the request without examining the SMT registry namespace and comparing the first and second network identities, in response to determining that the SMT flag has been set to the predetermined value.

7. The method of claim 1, further comprising:
- identifying a list of one or more tenant-units associated with the user based on a username or a user identifier (ID) of the user; and
- for each of the identified tenant-units in the list, iteratively performing examining an SMT registry namespace and comparing the first and second network identities to derive a list of tenant-units that the user is authorized to access.

8. The method of claim 1, wherein determining a first network identity associated with the user's secure connection session comprises:
- receiving a request to fork and execute a new process to service a network connection;
- obtaining a source IP address and a destination IP address associated with the network connection;
- determining whether the network connection is a secure shell (SSH) connection;
- in response to determining that the network connection is an SSH connection, copying the source IP address and the destination IP address into a process data-structure of the new process; and
- launching the new process with the process data-structure to perform examining an SMT registry namespace and comparing the first and second network identities, wherein the source and destination IP addresses are part of the first network identity.

9. A non-transitory machine-readable medium having instructions stored therein, which when executed by a processor, cause the processor to perform operations of configuring tenants of a multi-tenant storage system, the operations comprising:
- in response to a request received from a remote device of a user for configuring a tenant-unit of a storage system via a user's secure connection session, determining whether the tenant-unit requires a tenant admin role for access,
- if the tenant admin role is not required, then the request is allowed;
- if the tenant admin role is required,
  - determining a first network identity associated with the user's secure connection session wherein the first network identity is of the user's remote device used to establish the secure connection session;
  - examining a secure multi-tenancy (SMT) registry namespace to determine a second network identity that has been assigned to the tenant-unit;
  - comparing the first network identity with the second network identity to authenticate the user;
  - allowing the request to configure the tenant-unit in response to determining that the first network identity matches the second network identity; and
  - denying the request to configure the tenant-unit if the first and second network identities do not match.

10. The non-transitory machine-readable medium of claim 9, wherein the operations further comprise:
- determining a first local network address associated with the first network identity;
- retrieving a second local network address associated with the second network identity from a registry entry of the SMT registry namespace corresponding to the tenant-unit; and
- determining whether the first local network address matches the second local network address, wherein the request to configure the tenant-unit is allowed if the first and second local network addresses match.

11. The non-transitory machine-readable medium of claim 10, wherein the first local network address comprises a destination Internet protocol (IP) address associated with the user's secure connection session with respect to the remote device.

12. The non-transitory machine-readable medium of claim 10, wherein the operations further comprise:
- determining a first remote network address associated with the first network identity;
- retrieving a second remote network address associated with the second network identity from the registry entry of the SMT registry namespace corresponding to the tenant-unit; and
- determining whether the first remote network address matches the second remote network address, wherein the request to configure the tenant-unit is allowed if the first and second remote network addresses match.

13. The non-transitory machine-readable medium of claim 12, wherein the first remote network address comprises a source IP address associated with the user's secure connection session with respect to the remote device.

14. The non-transitory machine-readable medium of claim 9, wherein the operations further comprise:
- examining an SMT flag to determine whether the SMT flag has been set to a predetermined value; and
- allowing the request without examining the SMT registry namespace and comparing the first and second network identities, in response to determining that the SMT flag has been set to the predetermined value.

15. The non-transitory machine-readable medium of claim 9, wherein the operations further comprise:
  identifying a list of one or more tenant-units associated with the user based on a username or a user identifier (ID) of the user; and
  for each of the identified tenant-units in the list, iteratively performing examining an SMT registry namespace and comparing the first and second network identities to derive a list of tenant-units that the user is authorized to access.

16. The non-transitory machine-readable medium of claim 9, wherein determining a first network identity associated with the user's secure connection session comprises:
  receiving a request to fork and execute a new process to service a network connection;
  obtaining a source IP address and a destination IP address associated with the network connection;
  determining whether the network connection is a secure shell (SSH) connection;
  in response to determining that the network connection is an SSH connection, copying the source IP address and the destination IP address into a process data-structure of the new process; and
  launching the new process with the process data-structure to perform examining an SMT registry namespace and comparing the first and second network identities, wherein the source and destination IP addresses are part of the first network identity.

17. A storage system, comprising:
  a processor; and
  a secure multi-tenant (SMT) module executed by the processor to perform operations, the operations including
  in response to a request received from a remote device of a user for configuring a tenant-unit of the storage system via a user's secure connection session, determining whether the tenant-unit requires a tenant admin role for access,
  if the tenant admin role is not required, then the request is allowed;
  if the tenant admin role is required,
    determining a first network identity associated with the user's secure connection session wherein the first network identity is of the user's remote device used to establish the secure connection session,
    examining a secure multi-tenancy (SMT) registry namespace to determine a second network identity that has been assigned to the tenant-unit,
    comparing the first network identity with the second network identity to authenticate the user,
    allowing the request to configure the tenant-unit in response to determining that the first network identity matches the second network identity, and
    denying the request to configure the tenant-unit if the first and second network identities do not match.

18. The system of claim 17, wherein the operations further comprise:
  determining a first local network address associated with the first network identity;
  retrieving a second local network address associated with the second network identity from a registry entry of the SMT registry namespace corresponding to the tenant-unit; and
  determining whether the first local network address matches the second local network address, wherein the request to configure the tenant-unit is allowed if the first and second local network addresses match.

19. The system of claim 18, wherein the first local network address comprises a destination Internet protocol (IP) address associated with the user's secure connection session with respect to the remote device.

20. The system of claim 18, wherein the operations further comprise:
  determining a first remote network address associated with the first network identity;
  retrieving a second remote network address associated with the second network identity from the registry entry of the SMT registry namespace corresponding to the tenant-unit; and
  determining whether the first remote network address matches the second remote network address, wherein the request to configure the tenant-unit is allowed if the first and second remote network addresses match.

21. The system of claim 20, wherein the first remote network address comprises a source IP address associated with the user's secure connection session with respect to the remote device.

22. The system of claim 17, wherein the operations further comprise:
  examining an SMT flag to determine whether the SMT flag has been set to a predetermined value; and
  allowing the request without examining the SMT registry namespace and comparing the first and second network identities, in response to determining that the SMT flag has been set to the predetermined value.

23. The system of claim 17, wherein the operations further comprise:
  identifying a list of one or more tenant-units associated with the user based on a username or a user identifier (ID) of the user; and
  for each of the identified tenant-units in the list, iteratively performing examining an SMT registry namespace and comparing the first and second network identities to derive a list of tenant-units that the user is authorized to access.

24. The system of claim 17, wherein determining a first network identity associated with the user's secure connection session comprises:
  receiving a request to fork and execute a new process to service a network connection;
  obtaining a source IP address and a destination IP address associated with the network connection;
  determining whether the network connection is a secure shell (SSH) connection;
  in response to determining that the network connection is an SSH connection, copying the source IP address and the destination IP address into a process data-structure of the new process; and
  launching the new process with the process data-structure to perform examining an SMT registry namespace and comparing the first and second network identities, wherein the source and destination IP addresses are part of the first network identity.

* * * * *